(12) United States Patent
Stewart

(10) Patent No.: US 9,279,522 B2
(45) Date of Patent: *Mar. 8, 2016

(54) SLEEVE LOCK ASSEMBLY

(71) Applicant: James Stewart, San Clemente, CA (US)

(72) Inventor: James Stewart, San Clemente, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/304,888

(22) Filed: Jun. 14, 2014

(65) Prior Publication Data

US 2014/0290000 A1    Oct. 2, 2014

Related U.S. Application Data

(62) Division of application No. 13/115,918, filed on May 25, 2011, now Pat. No. 8,789,239.

(51) Int. Cl.
  *F16L 5/10*  (2006.01)
  *F16L 5/02*  (2006.01)
  *H02G 3/22*  (2006.01)

(52) U.S. Cl.
  CPC ....... *F16L 5/02* (2013.01); *F16L 5/10* (2013.01); *H02G 3/22* (2013.01); *Y10T 16/05* (2015.01); *Y10T 16/063* (2015.01); *Y10T 29/49826* (2015.01); *Y10T 29/49888* (2015.01)

(58) Field of Classification Search
  CPC ....... H01B 17/308; H02G 3/22; F16L 19/065; F16L 19/10; F16L 19/106; F16L 19/12; F16L 5/10; Y10T 16/05; Y10T 16/063; Y10T 16/075; Y10T 16/082; Y10T 16/088; Y10T 16/39; Y10T 16/42
  USPC ........ 16/2.1–2.5, 108, 109; 285/139.1–139.3, 285/249, 248, 342, 343; 439/207–277; 174/650, 152 G, 153 G, 152 R, 153 R, 174/652

See application file for complete search history.

(56) References Cited

U.S. PATENT DOCUMENTS

| | | | | | |
|---|---|---|---|---|---|
| 1,391,396 | A | * | 9/1921 | McMurtrie | H01B 17/308 174/153 R |
| 3,005,037 | A | * | 10/1961 | Miller | H01R 13/746 174/153 R |
| 6,294,734 | B1 | * | 9/2001 | Daoud | H02G 3/088 16/2.2 |
| 6,302,449 | B1 | * | 10/2001 | Clayton | F16L 5/06 285/192 |
| 7,267,372 | B2 | * | 9/2007 | Roberts | F16L 25/0036 285/249 |
| 7,390,027 | B2 | * | 6/2008 | Kiely | F16L 19/061 174/652 |

(Continued)

OTHER PUBLICATIONS

Thomas and Betts, Snap-N-Seal Compression Fittings Catalog, downloaded Apr. 2009.

(Continued)

*Primary Examiner* — Jeffrey O Brien

(57) ABSTRACT

A sleeve lock assembly for mounting to a sleeve may include a female ring member, a male ring member, and an annular locking member. The female ring member may include a threaded interior portion and an annular lip having an annular ramp surface. The male ring member may have an axial flange and a radial flange. The axial flange may have an annular end face and a threaded exterior portion for engaging the threaded interior portion of the female ring member. The locking member may include at least one annular gripping flange having a gripping edge. The locking member may be captured between the annular lip and the end face. Axial movement of the annular lip toward the end face may cause the gripping flange to slide against the ramp surface such that the gripping edge is urged into engagement with the outer sleeve surface.

8 Claims, 6 Drawing Sheets

(56) References Cited

U.S. PATENT DOCUMENTS

| | | | | |
|---|---|---|---|---|
| 7,976,070 | B2* | 7/2011 | Kiely | F16L 19/061 174/652 |
| 2004/0150225 | A1* | 8/2004 | Roberts | F16L 25/0036 285/340 |
| 2005/0067832 | A1* | 3/2005 | Marelli | F16L 19/0656 285/139.1 |
| 2005/0104372 | A1* | 5/2005 | Auray | F16L 19/063 285/139.1 |
| 2005/0212288 | A1* | 9/2005 | Stewart | F16L 19/065 285/249 |

OTHER PUBLICATIONS

Thomas and Betts, Raintight Compression Fittings Catalog, downloaded Apr. 2009.

Elecor, Electrical Fittings Catalog, Nov. 2007.

Cooper Crouse Hinds, Raintight Compression Fittings Catalog, Jan. 2009.

* cited by examiner

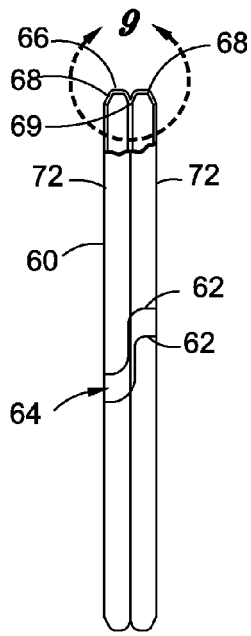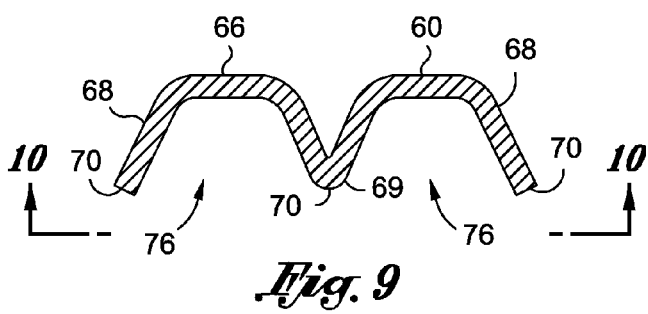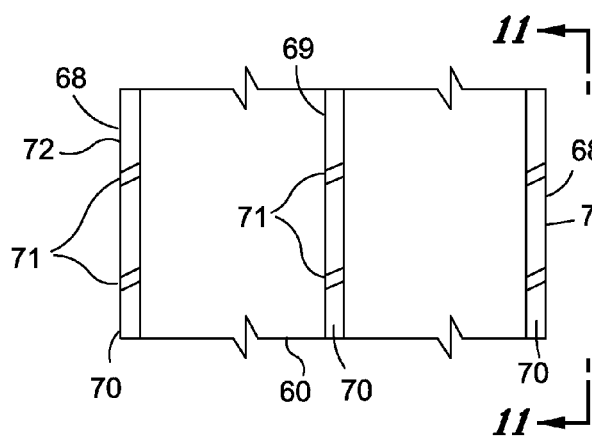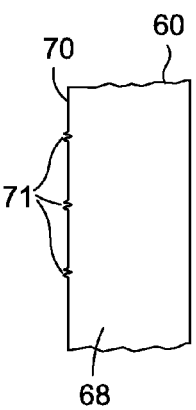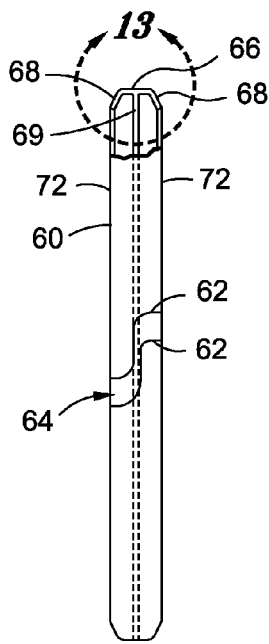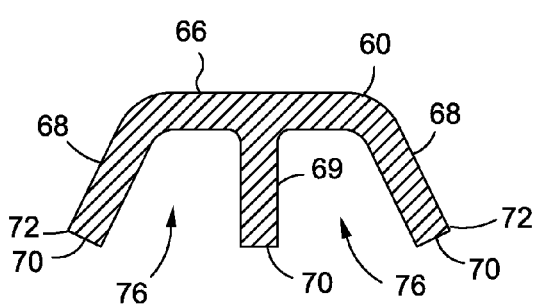
Fig. 8
Fig. 9
Fig. 10
Fig. 11
Fig. 12
Fig. 13

SLEEVE LOCK ASSEMBLY

CROSS-REFERENCE TO RELATED APPLICATIONS

The present application is a divisional application of and claims priority to pending U.S. application Ser. No. 13/115,918 filed on May 25, 2011, and entitled SLEEVE INSTALLATION SYSTEM AND METHOD, the entire contents of which is expressly incorporated by reference herein.

FIELD

The present disclosure relates generally to cabling penetrations in walls and floors and, more particularly, to systems and methods for providing a sealed penetration in a wall or a floor and wherein the system is resistant to movement.

BACKGROUND

During the construction of a new building, numerous cables such as communications cables are typically routed to various locations throughout the building. The communications cables must pass through multiple walls and floors of the building. At locations where cables pass through a wall or a floor, a penetration is typically formed. Most penetrations are subject to fire codes which generally require that when cabling is passed through the penetration, the penetration is sealed to prevent the passage of smoke and flames through the penetration from one room into an adjacent room.

For existing structures, new cabling such as fiber optic cables or copper communications cables may be routed to the building from newly-installed underground communications conduits. Underground communications conduits typically run generally horizontally toward the exterior side of a building and are then directed upwardly above the ground surface at the exterior surface of the building. In order to create a pathway for entry of the cabling into the building, it is necessary to form a penetration through the exterior wall of the building. In order prevent the passage of moisture through the penetration, it is typically necessary to seal the penetration. Furthermore, it is typically desirable to minimize movement of the cabling relative to the wall during seismic activity such that the integrity of the penetration seal is maintained.

In view of the requirements for penetrations in buildings, there exists a need in the art for a system and method for forming a cabling penetration in a wall wherein the penetration may be sealed against the elements such as dirt, debris, and water. In addition, there exists a need in the art for a system and method for forming a penetration in a wall wherein the cabling may be stabilized against movement relative to the wall such that the integrity of the penetration seal may be maintained. Ideally, such a system and method for forming a penetration in a wall is of low cost and requires a minimal amount of time for installation.

BRIEF SUMMARY

The above-described needs associated with penetrations for cabling are specifically addressed and alleviated by the present disclosure which, in an embodiment, provides a sleeve installation for a panel having opposing panel sides and a penetration formed in the panel. The sleeve may have an outer sleeve surface and may extend at least partially into the penetration. A sleeve lock assembly may be mounted to the sleeve. The sleeve lock assembly may include a female ring member that may include a threaded interior portion and an annular lip. The sleeve lock assembly may further include a male ring member having an axial flange and a radial flange. The axial flange may have an annular end face and a threaded exterior portion for engaging the threaded interior portion of the female ring member. The sleeve lock assembly may additionally include an annular locking member having opposing ends defining a gap therebetween. The locking member may include at least one annular gripping flange for engaging the outer sleeve surface. The sleeve lock assembly may be configured such that axial movement of the annular lip toward the end face may cause the gripping flange to engage the outer sleeve surface.

In a further embodiment, a sleeve installation for a penetration in a panel may include a sleeve and a sleeve lock assembly. The sleeve may have an outer sleeve surface and may extend at least partially into the penetration in the panel. The sleeve lock assembly may be mounted to the sleeve and may include a female ring member, a male ring member, and an annular locking member. The female ring member may include a threaded interior portion and an annular lip. The annular lip may include an annular ramp surface. The male ring member may have an axial flange and a radial flange extending outwardly from the axial flange. The axial flange may have an annular end face and a threaded exterior portion for engaging the threaded interior portion of the female ring member. The locking member may have opposing ends defining a gap therebetween. The locking member may include a central band and at least one annular gripping flange having a gripping edge to engage the outer sleeve surface. The locking member may be captured between the annular lip and the end face. Axial movement of the annular lip toward the end face may cause one of the gripping flanges to slide against the ramp surface such that the gripping edge is urged into engagement with the outer sleeve surface.

In a further embodiment, disclosed is a method of installing a sleeve in a panel having opposing panel sides and a penetration. The method may include extending the sleeve at least partially into the penetration such that the sleeve protrudes beyond at least one of the panel sides. The method may further include the steps of mounting a sleeve lock assembly on the sleeve by mounting a male ring member on the sleeve and providing a female ring member having a threaded interior portion and an annular lip having an annular ramp surface. The method may additionally include installing an annular locking member into the female ring member wherein the locking member includes at least one annular gripping flange.

The threaded interior portion of the female ring member may be threadably engaged to the threaded exterior portion of the male ring member such that the locking member is captured between the annular lip and an end face of the male ring member. The method may further include rotating the male and female ring members relative to one another to cause relative axial motion of the male and female ring members such that one of the gripping flanges slides against the ramp surface. The method may additionally include engaging the gripping flanges to the sleeve outer surface in response to rotation of the male and female ring members relative to one another. The method may also include preventing movement of the sleeve lock assembly relative to the sleeve in response to the engagement of the gripping flanges into the sleeve outer surface.

The features, functions and advantages that have been discussed can be achieved independently in various embodiments of the present disclosure or may be combined in yet other embodiments, further details of which can be seen with reference to the following description and drawings below

BRIEF DESCRIPTION OF THE DRAWINGS

These and other features of the present disclosure will become more apparent upon reference to the drawings wherein like numerals refer to like parts throughout and wherein:

FIG. 8 is a side view of the annular locking member in an alternative embodiment;

FIG. 9 is a cross-sectional view of the locking member taken along line 9 of FIG. 8 and illustrating an intermediate flange formed in the compression ring;

FIG. 10 is a bottom view of the locking member taken along line 10 of FIG. 9 and illustrating one or more mechanical features that may be formed in a gripping edge of the intermediate flange;

FIG. 11 is a side view of the locking member taken along line 11 of FIG. 10 and illustrating the one or more mechanical features that may be formed in the gripping edges of the gripping flanges and intermediate flange;

FIG. 12 is a side view of the annular locking member in a further embodiment;

FIG. 13 is a cross-sectional view of the locking member taken along line 13 of FIG. 12 and illustrating an alternative embodiment of the intermediate flange formed in the compression ring.

DETAILED DESCRIPTION

Figure 1:
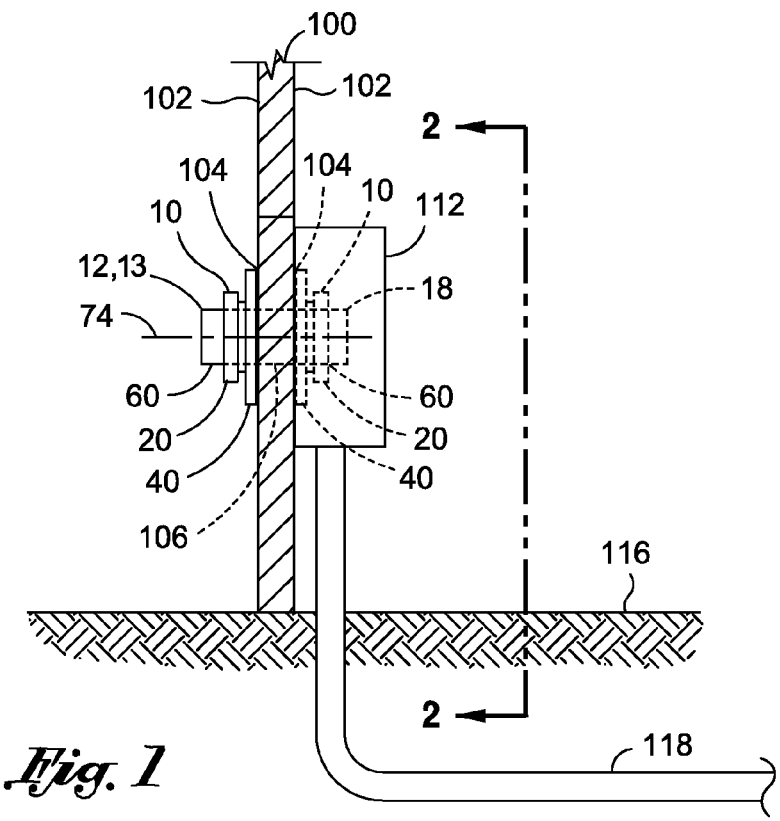
FIG. 1 is a plan view of a sleeve installation and illustrating a ground communications conduit coupled to a junction box mounted to a side of a wall and further illustrating a pair of sleeve lock assemblies for mounting a sleeve to a penetration formed in the wall.
Figure 2:
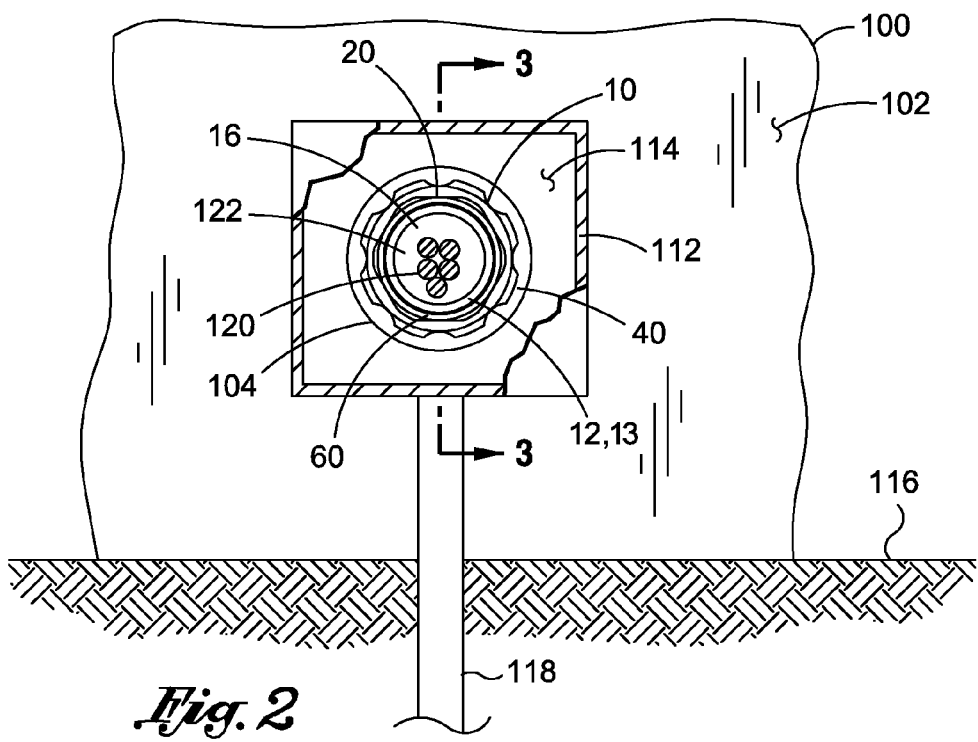
FIG. 2 is a front view of the sleeve installation taken along line 2 of FIG. 1 and illustrating the ground communications conduit joined to the junction box and further illustrating one of the sleeve lock assemblies mounted to the sleeve inside the junction box.

Referring now to the drawings wherein the showings are for purposes of illustrating preferred and various embodiments of the disclosure, shown in FIGS. 1-2 are illustrations of a penetration 106 through an exterior wall of a building using a sleeve 12 or a conduit 13 and a pair of sleeve lock assemblies 10 mounted to the sleeve 12 or conduit 13. The sleeve 12 may provide a means to route cabling 120 through a wall or panel 100. The conduit 13 may comprise any type of conduit including, but not limited to, electrical conduit and plumbing pipe. The sleeve lock assemblies 10 advantageously couple the sleeve 12 or the conduit 13 to the wall or panel 100 in a manner preventing axial movement of the sleeve 12 or conduit 13 relative to the wall or panel 100. In addition, each sleeve lock assembly 10 provides a means for sealing the penetration 106 in the wall against the passage of moisture and/or debris. For interior walls or panels 100, the sleeve lock assembly 10 advantageously provides a means for sealing the penetration 106 against the passage of smoke, fire and other undesirable elements. Although the embodiments disclosed herein are described in the context of mounting a sleeve 12 of relatively short length to a penetration in a wall or panel 100 using one or more sleeve lock assemblies 10, the sleeve lock assemblies 10 may also be used to mount a conduit 13 (e.g., electrical conduit, plumbing pipe) of relatively long length to a penetration in a wall or a panel 100.

In the embodiment shown in FIGS. 1-2, the sleeve lock assembly 10 may be housed within a junction box 112. The junction box 112 may be mounted to the wall such as an exterior wall of a building. The junction box 112 may function as a termination point for cabling 120 that may be routed to the junction box 112 through an exterior conduit 118. In an embodiment, the junction box 112 may be included with the sleeve 12 installation to provide an enclosure for cabling 120 connections and fittings. The junction box 112 may be a NEMA-rated (National Electrical Manufacturer Association) to provide protection against dust, dirt, debris, water, and ice damage.

The exterior conduit 118 may provide a means for routing utilities (e.g., communications, electrical power, plumbing, etc.) to the building. In the embodiment shown in FIGS. 1-2, the exterior conduit 118 may include a vertical portion comprised of rigid metallic conduit (RMC) extending upwardly from an underground 116 portion of the exterior conduit 118. The underground 116 portion of the exterior conduit 118 may be formed of any suitable material such as polyvinylchloride (PVC) or other suitable material. The exterior conduit 118 may house one or more cables such as communications cabling 120 including, but not limited to, fiber optic cabling, copper cabling, and other types of cabling. In this regard, the exterior conduit 118 may house any type of cabling and is not limited to communications cabling. Furthermore, the exterior conduit 118 may comprise exterior plumbing lines or exterior piping or any other type of conduit or piping for housing any one of a variety of different utilities.

The sleeve 12 may be installed in the penetration 106 such that the sleeve 12 protrudes beyond each side 102 of the wall or panel 100. The sleeve 12 may be provided in a length such that a portion of the sleeve 12 protrudes from each side 102 of the panel 100 by an amount that allows for mounting one of the sleeve lock assemblies 10. For example, the sleeve 12 may be provided in a length of approximately twelve (12) to eighteen (18) inches such that several inches of the sleeve 12 protrudes from each side 102 of the wall or panel 100. However, as indicated above, a conduit 13 of relatively long length may be installed in the penetration 106 such that relatively long portions (not shown) of the conduit 13 may protrude from each side of the panel 100. Although not shown, the portions of the conduit may be jointed to other conduits. The conduit 13 may be configured to house or contain any one of a variety of objects including, but not limited to, fluids including liquids such as water, fuel, oil, and also including gasses such as natural gas, air, or other types of gas. The conduit 13 may also be configured to contain wiring, cabling, and any one of a variety of other objects, without limitation.

For the installation illustrated in FIGS. 1-2, the sleeve 12 may pass through the penetration 106 and enter the junction box 112 through an opening (not shown) that may be formed in a back wall 114 of the junction box 112. The sleeve 12 may protrude into the junction box 112 by approximately one (1) inch although the amount of the protrusion may be selected based upon the dimensions (e.g., diameter) of the sleeve lock assembly 10. The back wall 114 of the junction box 112 may be captured or sandwiched between the sleeve lock assembly 10 and the panel 100 side 102.

FIG. 2 further illustrates cabling 120 extending out of the exterior conduit 118 and which may be coupled or connected to cabling 120 passing through the sleeve 12. The cabling 120 passing through the sleeve 12 may be sealed within the sleeve interior 16 to provide a barrier against moisture, debris, and other elements. For example, a cabling sealant 122 may be installed within the sleeve interior 16 and may be formed around the cabling 120. For installations where the sleeve 12 passes through an exterior wall, the cabling sealant 122 may be formed of a water-resistant material and may prevent the intrusion of rain, sleet, melted snow or ice, and debris such as dust, insects and other undesirable elements.

Although FIGS. 1-2 illustrate the mounting of the sleeve 12 and sleeve lock assemblies 10 on a penetration 106 in an exterior wall through a junction box 112, the present disclosure includes the installation of the sleeve 12 and sleeve lock assemblies 10 in a penetration 106 in an interior wall or in other building elements. For interior walls, the cabling 120 shown in FIG. 2 may be sealed within the sleeve interior 16 with a fire-stopping system such as mineral wool covered with putty or other suitable sealant systems for preventing the passage of smoke, heat and flames through the sleeve 12. In this regard, it should be noted that the sleeve 12 and sleeve lock assemblies 10 may be installed in penetrations 106 formed in any type of panel 100, without limitation. For example, the panel 100 may comprise an interior or exterior wall as described above. In addition, the panel 100 may comprise any type of partition, floor, ceiling, divider, membrane, plate, or any other element, without limitation, where a penetration 106 is required for passage of conduit, cabling or other items.

Figure 3:
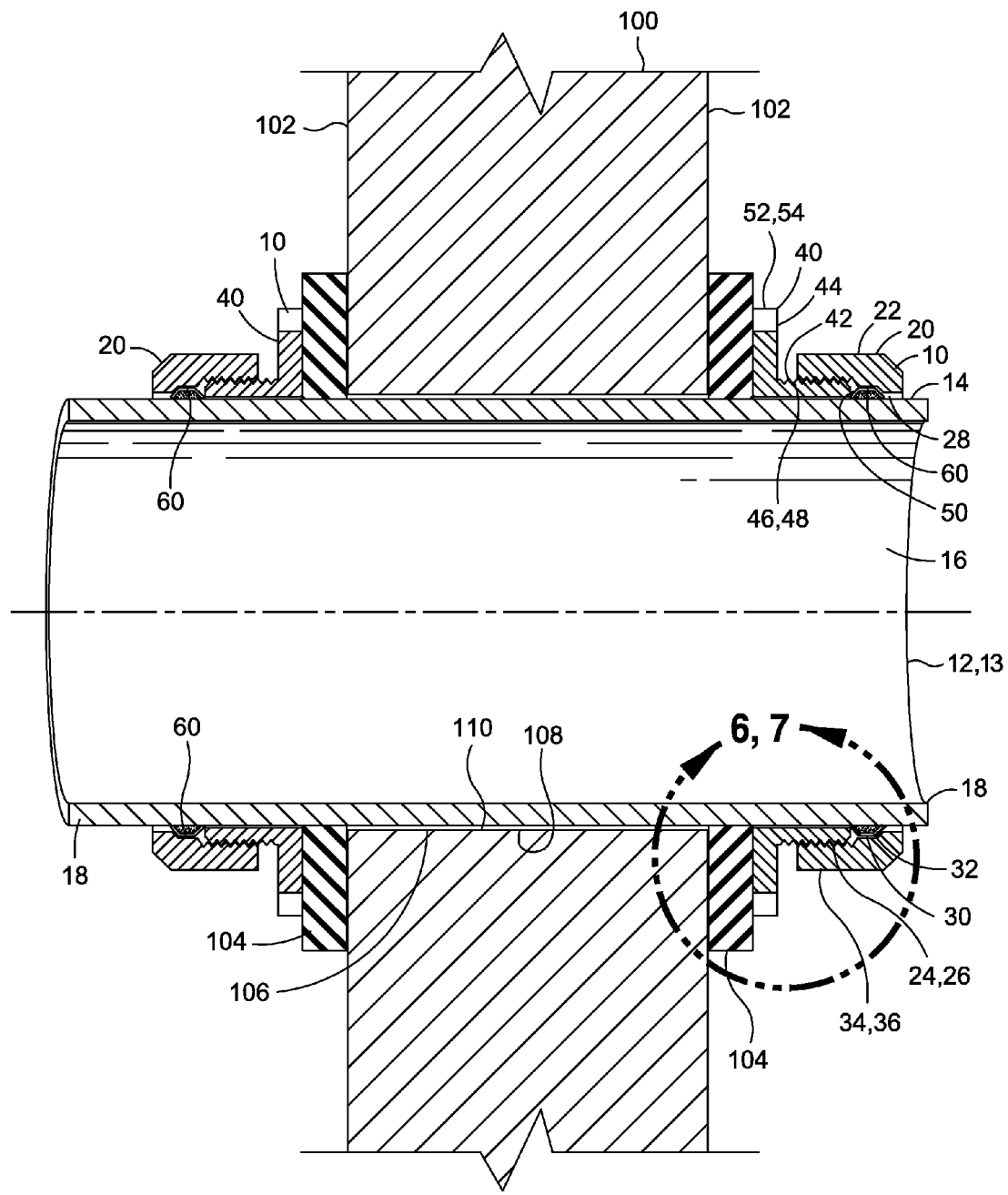
FIG. 3 is an sectional view of the sleeve installation taken along line 3 of FIG. 2 and illustrating the sleeve lock assemblies mounted to the wall with the junction box omitted for clarity.

Referring to FIG. 3, shown is an enlarged sectional view of the sleeve 12 installation illustrating the sleeve lock assemblies 10 mounted on the sleeve 12 on opposite sides 102 of a panel 100 (e.g., wall) with the junction box omitted for clarity. The sleeve 12 may extend through the penetration 106 in the panel 100 such that the sleeve 12 preferably protrudes beyond each one of the panel sides 102. However, it is contemplated that for certain installation (not shown), the sleeve 12 may extend partially into the penetration 106 such that the sleeve 12 protrudes beyond one of the panel sides 102 with a single one of the sleeve lock assemblies 10 being mounted to the protruding portion of the sleeve 12.

In FIG. 3, the penetration 106 may have a cylindrical inner surface 108 that is preferably formed at a size larger in diameter that the diameter or size of the sleeve 12 such that an annular gap is formed between the outer sleeve surface 14 and the penetration inner surface 108. For example, for an approximately four (4) inch diameter sleeve 12, a penetration 106 diameter of approximately five (5) inches may be formed in a panel 100 such as a wall. If the sleeve 12 is centered within the penetration 106, an annular gap of approximately 0.5 inch may be formed between the inner surface 108 of the penetration 106 and the outer sleeve surface 14. A penetration sealant 110 such as silicone caulking or other sealant material may be installed within the annular gap to reduce or prevent the passage of water, air, smoke or other debris through the annular gap.

Figure 4:
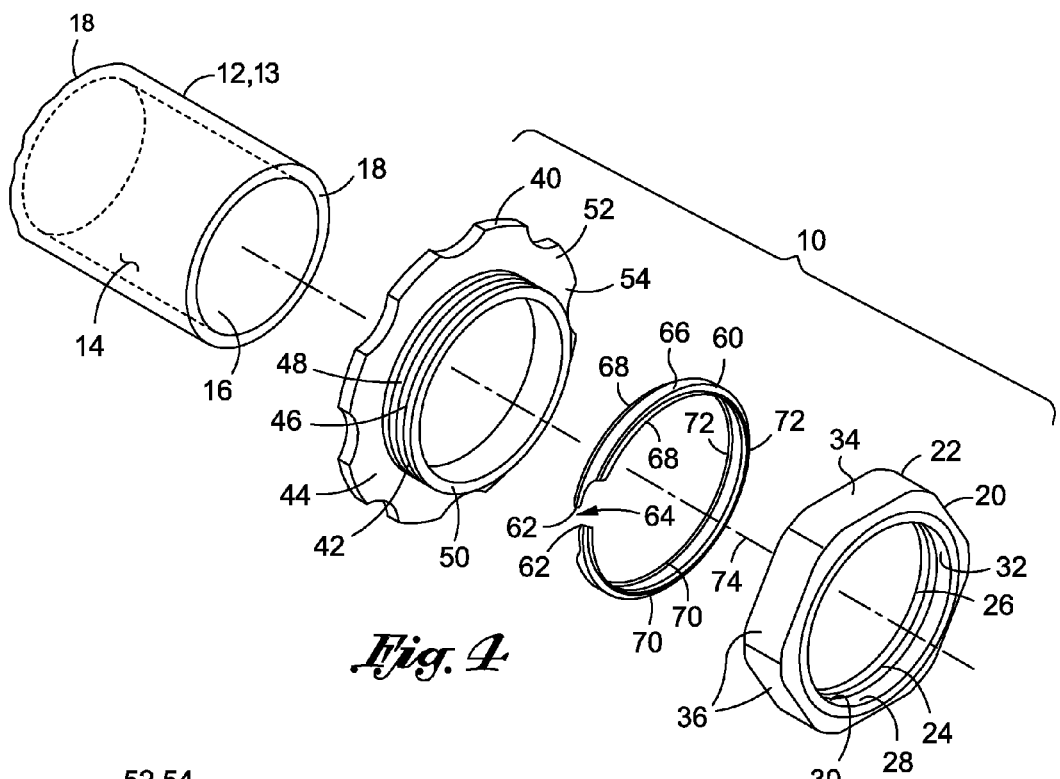
FIG. 4 is an exploded perspective view of a sleeve and the components that make up the sleeve lock assembly.

Referring to FIG. 4, shown is an exploded view of the sleeve 12 and the components that make up the sleeve lock assembly 10. The sleeve 12 may be formed in a substantially cylindrical shape having an outer sleeve surface 14 and including a sleeve interior 16 and opposing sleeve ends 18. The sleeve 12 may be formed of a metallic material such as steel, aluminum or other metallic material. For example, the sleeve 12 may preferably be formed of relatively thin gauge electrical metallic tubing (EMT) or relatively thick gauge rigid metallic conduit (RMC) in any suitable size such as in one (1) inch diameter up to ten (10) inches in diameter. However, the sleeve 12 may be provided in diameters that may be larger or smaller than the 1-10 inch range. The sleeve 12 may comprise plumbing pipe formed of copper, brass, steel, iron, or any other suitable material and in diameters ranging from one (1) inch diameter up to eight (8) inches in diameter although diameters larger or smaller than the 1-8 inch range are contemplated. The sleeve 12 may also be formed of plumbing pipe or water pipe, or other types of piping.

Depending on the installation (i.e., residential, commercial, industrial) and local building codes, the sleeve 12 may also be formed of polymeric materials such as high strength plastic material including, but not limited to, polystyrene or polyethylene. In addition, the sleeve 12 may be formed of composite materials such as graphite/epoxy composite material or carbon/fiber composite material. In this regard, the material from which the sleeve 12 is formed is preferably a relatively high-strength material having a relative high temperature rating to comply with fire codes or other building code requirements. It should also be noted that any of the above-mentioned sizes and materials for forming the relatively short length of the sleeve 12 may be used in forming a relatively long length of conduit 13 that may be mounted to the penetration 106.

Figure 5:
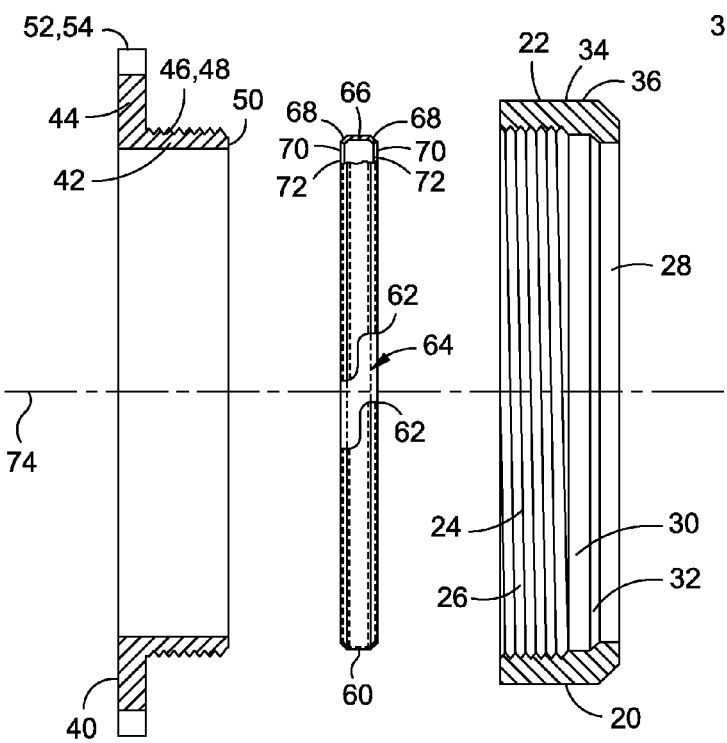
FIG. 5 is a side section view of a female ring member, an annular locking member, and a male ring member of the sleeve lock assembly.

Referring to FIGS. 4-5, the components of the sleeve lock assembly 10 may comprise a female ring member 20, a male ring member 40, and an annular locking member 60. The female ring member 20 may include a collar 22 having a threaded interior portion 24 with threads 26 formed thereon. In addition, the female ring member 20 may include a substantially cylindrical annular lip 28 formed on an end of the female ring member 20 opposite the threaded interior portion 24. As best seen in FIG. 5, the annular lip 28 may be directed radially-inwardly and may include an annular inner surface 30 and an annular ramp surface 32. The annular lip 28 may be provided in a size (e.g., diameter) allowing the annular lip 28 to be slidably mounted to the sleeve 12. As best seen in FIG. 4, the collar 22 may include one or more external surfaces 34 such as a plurality of flats 36 or other surfaces feature. For example, the flats 36 of the collar 22 may be formed in a hex shape to facilitate engagement of the female ring member 20 with a device for rotating the female ring member 20. Alternatively, the female ring member 20 may be provided with mechanical surface features such as a knurled surface to facilitate manually gripping the female ring member 20 and rotating the female ring member 20 and/or applying torque to the female ring member 20.

The male ring member 40 may include an axial flange 42 and a radial flange 44. The radial flange 44 may extend radially outwardly from the axial flange 42 and may include an outer edge 52 having surface features 54 such as scallops, detents, flats 36, knurls, and/or other features to facilitate gripping the radial flange 44 for rotation thereof. The radial flange 44 may be provided in a size (e.g., a diameter) that is larger than the penetration 106 diameter. In addition, the radial flange 44 may be sized to provide an amount of surface area for bearing against and/or sealing against a panel 100 (e.g., a wall) or sealing against a gasket 104 that may optionally be inserted between the panel 100 and the male ring member 40. For example, for a four (4) inch diameter sleeve 12 passing through a five (5) inch diameter penetration 106, the radial flange 44 may be provided in a diameter of up to approximately 8-12 inches or larger although sizes smaller than eight (8) inches are contemplated for the radial flange 44 diameter. The radial flange 44 may also be sized with a relatively large diameter to facilitate rotating the male and female ring members 40, 20 relative to one another. As used with regard to the radial flange 44, the term diameter is in general reference to the diameter across the outwardmost points on the radial flange 44 accounting for scallops or other features that may be included with the radial flange 44.

Figure 6:
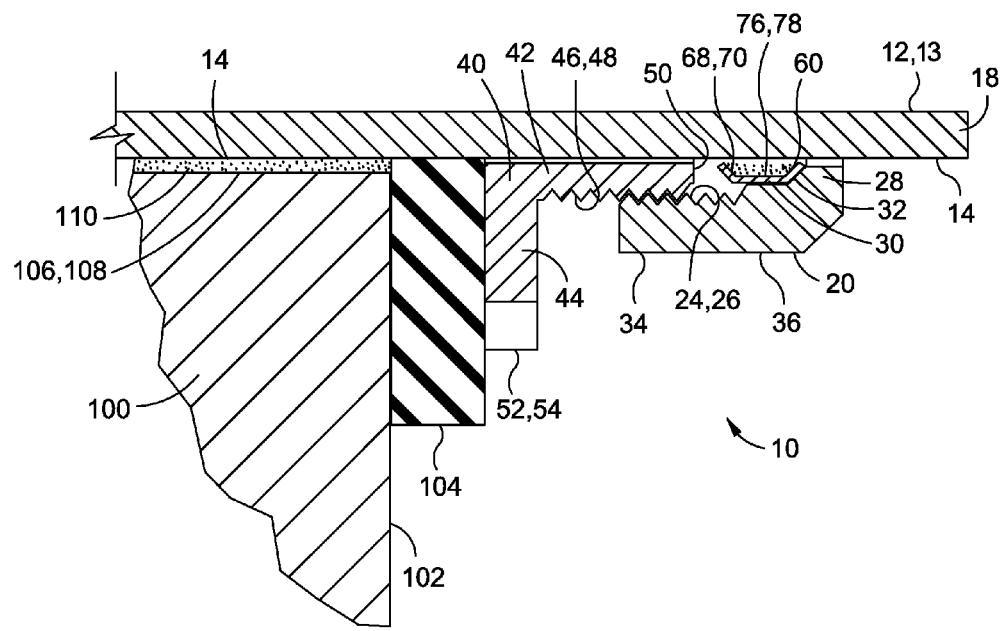
FIG. 6 is a sectional view of a portion of the sleeve lock assembly and illustrating the sleeve, the male and female ring members, and the locking member wherein the locking member is disengaged from the sleeve outer surface.
Figure 7:
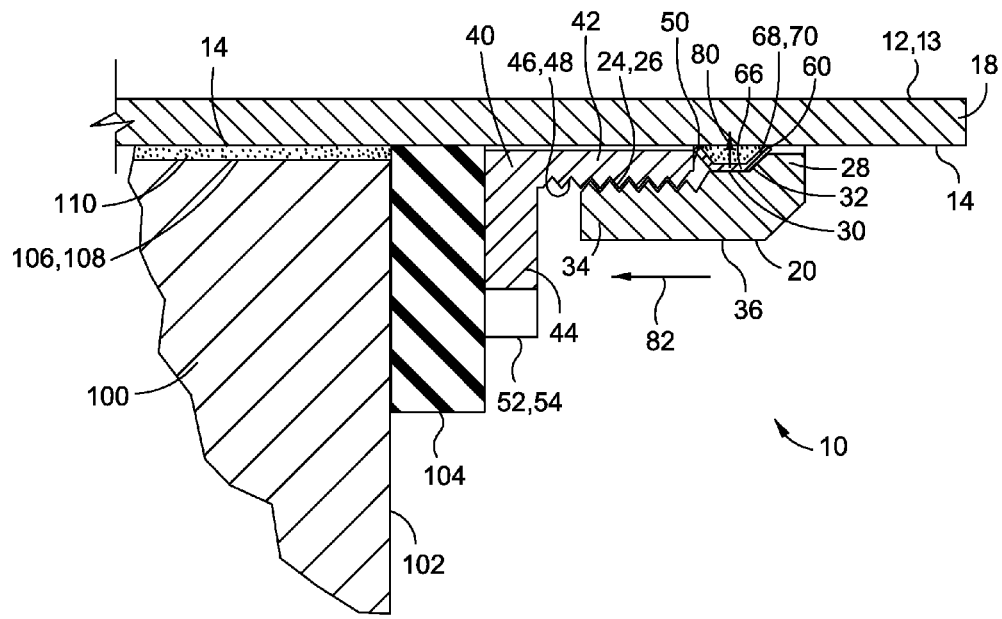
FIG. 7 is sectional view of a portion of the sleeve lock assembly wherein the locking member is engaged to the sleeve outer surface.

Referring still to FIGS. 4-5, the axial flange 42 of the male ring member 40 may be sized and configured to be slidably mounted onto the sleeve 12. The axial flange 42 may be provided in a substantially cylindrical shape. The axial flange 42 may additionally have a threaded exterior portion 46 including threads 48 for engaging the threads 26 of the threaded interior portion 24 of the female ring member 20 as shown in FIGS. 6-7 and described below. In FIGS. 4-5, the male ring member 40 may further include an annular end face 50 for engaging the locking member 60 in a manner as is described below.

The annular locking member 60 may have a generally discontinuous circumference and opposing ends 62 defining a gap 64 therebetween. In the embodiment shown, the gap 64 may be serpentine-shaped which may minimize or prevent a line-of-sight path for moisture intrusion past the locking member 60. The serpentine-shaped gap 64 may result from an S-shaped configuration of each one of the ends 62 of the locking member 60 as shown in FIG. 5. Advantageously, the serpentine-shaped gap 64 may additionally increase the circumferential length of the gripping flanges 68 of the locking member 60 relative to the circumferential length of gripping flanges having simple butt cut ends (not shown) formed at a ninety-degree angle (not shown).

As shown in FIGS. 4-5, the locking member 60 may comprise a central band 66 and at least two annular inwardly-extending gripping flanges 68 on axially opposite sides 72 of the central band 66. The gripping flanges 68 may be oriented at a non-perpendicular angle relative to an axis 74 of the locking member 60. The angled orientation of the gripping flanges 68 may facilitate compression of the locking member 60 against the outer sleeve surface 14 as shown in FIG. 7. Each one of the gripping flanges 68 may have a gripping edge 70 that may be configured to engage the outer sleeve surface 14 (FIG. 7). In an optional embodiment, the gripping flanges 68 may include a plurality of protuberances (not shown) or raised mechanical features (not shown) formed on the gripping edges 70 to enhance the engagement of the gripping edges 70 to the outer sleeve surfaces 14 (FIG. 7).

The locking member 60 may preferably be formed of metallic material such as steel or other high strength and/or high hardness metallic material for engaging the outer sleeve surface 14 in a manner preventing axial movement of the sleeve lock assembly 10 relative to the sleeve 12. Although steel may be a preferred material for the locking member 60, any material having sufficient hardness may be used. In addition, the material for the locking member 60 is preferably resilient such that the locking member 60 may be retained within the female ring member 20 when the female ring member 20 is removed from the sleeve 12. In this regard, the locking member 60 may be formed such that the central band 66 has an unrestrained diameter (i.e., when removed from the female ring member 20) that is larger than the diameter of the inner surface 30 of the female ring member 20. The diameter of the locking member 60 is preferably sized to minimize the gap 64 between the ends 62 of the locking member 60 when the locking member 60 is compressed against the outer sleeve surface 14 to improve the sealing capability.

Referring to FIGS. 3 and 6-7, the locking member 60 may be captured between the annular lip 28 of the female ring member 20 and the end face 50 of the male ring member 40 when the male member is threadably engaged to the female ring member 20 and mounted on the sleeve 12. As shown in FIG. 6, the locking member 60 may be biased against the inner surface 30 of the female ring member 20. The annular gripping flanges 68 may be spaced away from the outer sleeve surface 14. When the male and female ring members 40, 20 and the locking member 60 are mounted on the sleeve 12 and threadably engaged to one another, relative rotation of the rotation of male and female ring members 40, 20 may result in axial movement of the annular lip 28 toward the end face 50 along the direction 82.

As shown in FIG. 7, when the gripping flanges 68 come into contact with the end face 50 and the ramp surface 32, one of the gripping flanges 68 may slide relative to the ramp surface 32 resulting in the locking member 60 compressing radially inwardly along the direction 80 until the gripping edges 70 engage the outer sleeve surface 14. In this manner, the gripping flanges 68 may provide sealing capability against the sleeve 12. The sealing capability may be enhanced by optionally including locking member sealant 78 in a concave region 76 of the locking member 60. The concave region 76 may be bounded by the gripping flanges 68 and the central band 66. The locking member sealant 78 may comprise silicone sealant or other sealant that may adhere to the locking member and/or outer sleeve surface 14 and which may provide sealing capability against water and debris.

Referring to FIG. 8-11, shown are views of the annular locking member 60 in an alternative embodiment having an intermediate flange 69 formed in the locking member 60 between the gripping flanges 68. As can be seen in FIG. 8, the intermediate flange 69 may extend substantially around a circumference of the locking member 60 in a manner similar to the gripping flanges 68. FIG. 9 illustrates a cross section of the locking member 60 showing an embodiment of the intermediate flange 69 having a V-shape that may be integrally formed in the locking member 60. The intermediate flange 69 may be formed by rolling the V-shape into the central band 66 of the locking member 60 using a pair of matched roller dies (not shown). The V-shape of the intermediate flange 69 may provide some degree of resilient flexibility or compressibility to the intermediate flange 69 when the locking member 60 is compressed by tightening the female ring member 20 onto the male ring member 40 as described above with regard to FIGS. 6-7. Although shown as being generally centered between the gripping flanges 68, the intermediate flange 69 may be biased toward one of the gripping flanges 68. Even further, although FIGS. 8-10 illustrate a single intermediate flange 69, any number of intermediate flanges 69 may be provided between the gripping flanges 68. Each one of the intermediate flanges 69 may have a length that extends downwardly from the central band 66 to approximately the same radial distance as the gripping flanges 68 such that all of the gripping edges 70 may at least partially engage the sleeve 12.

Referring to FIGS. 10-11, the gripping edges 70 of the gripping flanges 68 and/or intermediate flange 69 may be provided with mechanical features 71 such as indentations, hash marks, protuberances, or other mechanical features 71. The mechanical features 71 may increase the engagement of the locking member 60 to the sleeve 12 and may provide increased resistance to axial or rotational movement of the locking member 60 relative to the sleeve 12. In this regard, the mechanical features 71 on the gripping edges 70 may be driven at least partially into the outer surface of the sleeve 12 when the locking member 60 is compressed radially inwardly along the direction 80 in FIG. 7. In addition, the mechanical features 71 shown in FIGS. 10-11 may increase the sealing capability of the gripping edges 70 with the sleeve 12. The sealing capability may be further increased by including locking member sealant 78 (FIG. 7) in the concave regions 76 defined by the gripping flanges 68 and intermediate flanges 69 as shown in FIG. 9.

Referring to FIGS. 12-13, shown is an alternative embodiment of the intermediate flange 69 that may be formed in the locking member 60. As shown in FIG. 12, the intermediate flange 69 may extend substantially around the circumference of the locking member 60 similar to the intermediate flange 69 shown in FIG. 8. FIG. 13 is a cross-sectional view of the locking member 60 illustrating the intermediate flange 69 extending radially inwardly from the central band 66 such that the central band 66 and the intermediate flange 69 form a T shape. The intermediate flange 69 in FIG. 13 may be integrally formed with the locking member 60 such as by casting or other suitable forming process. Although shown as extending generally perpendicularly from the central band 66, the intermediate flange 69 may be oriented at any angle relative to the central band 66.

The angle of orientation of the intermediate flange 69 and gripping flanges 68 may be selected to provide a desired degree of compressibility of the locking member 60 in the direction 80 (FIG. 7) when the female ring member 20 is moved in the axial direction 82 relative to the male ring member 40 in FIG. 7. For example, a relatively low degree of compressibility of the locking member 60 may be provided by orienting the intermediate flange 69 generally perpendicularly relative to the central band 66 as shown in FIG. 13 and which may increase the engagement of the locking member 60 to the sleeve 12. Conversely, by forming the intermediate flange 69 at a non-perpendicular angle relative to the central band 66, the locking member 60 may have a relatively higher degree of compressibility which may provide improved sealing capability of the locking member 60 to the sleeve 12 due to the ability of the locking member 60 to compress and conform to the outer sleeve surface 14 (FIG. 7). In this regard, mechanical features 71 such as indentations and/or protuberances shown in FIGS. 10-11 may be formed in gripping edges 70 of the intermediate flange 69 and/or gripping flanges 68 of FIG. 13 to increase the engagement of the locking member 60 to the sleeve 12 and to improve the sealing capability of the gripping edges 70 with the sleeve 12 as described above. Locking member sealant 78 (FIG. 7) may be included in the concave regions 76 defined by the gripping flanges 68 and intermediate flanges 69 as shown in FIG. 9.

Figure 14:
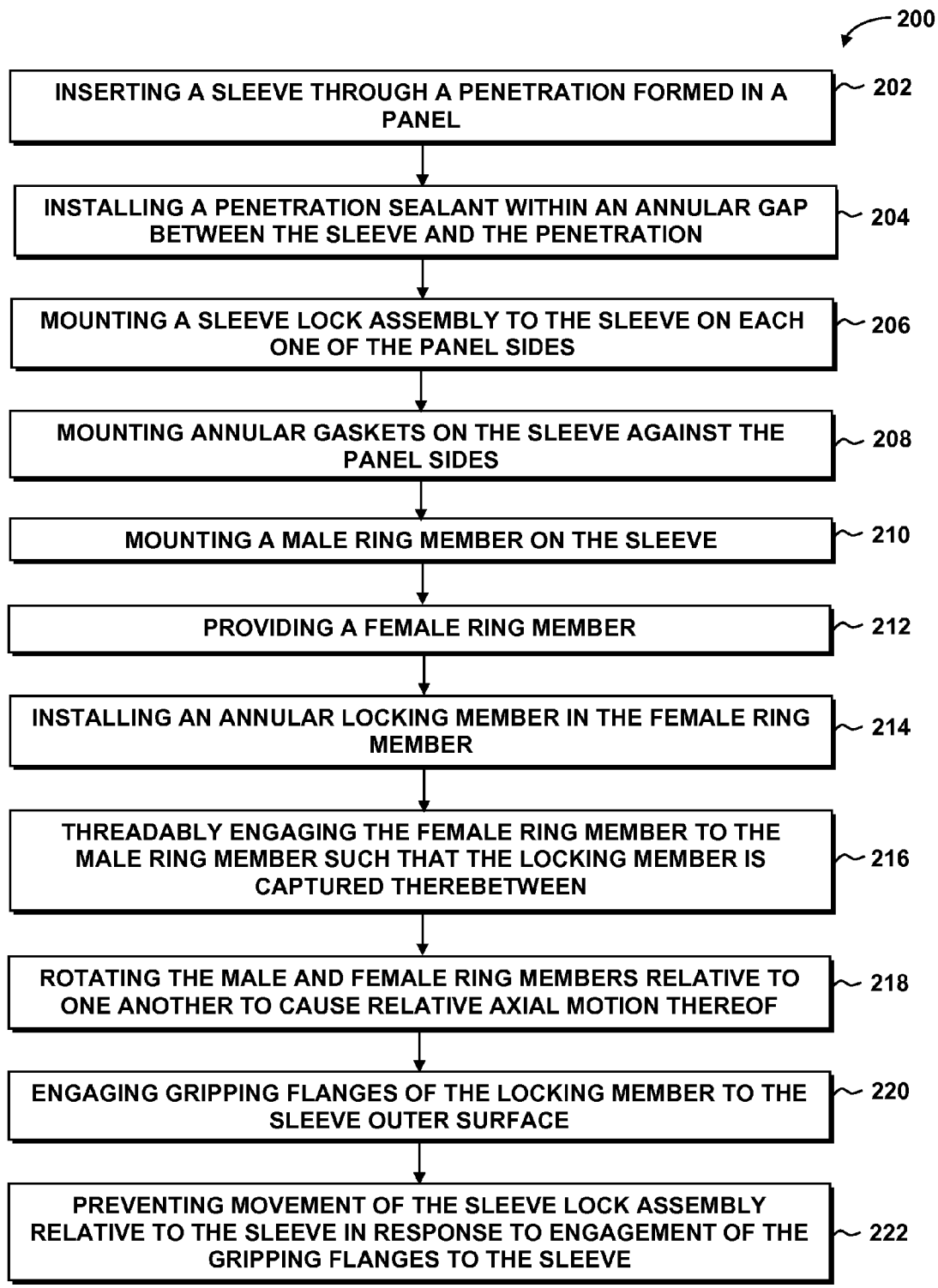
FIG. 14 is a flow chart illustrating one or more operations that may be included in a methodology for installing a sleeve in a wall.

Referring to FIG. 14, shown are one or more operations that may be included, in whole or in part, in a methodology 200 of installing a sleeve 12 in a panel 100. The methodology 200 may be implemented for the installation of a sleeve 12 in a panel 100 of any type, without limitation. For example, the methodology 200 may be implemented for installation of a sleeve 12 in a wall, a floor, a membrane, a plate, or any other element or structural member where a penetration 106 is required.

Step 202 of the methodology 200 may include forming a penetration 106 in a panel 100 and installing a sleeve 12 in the penetration 106 as shown in FIG. 3. The sleeve 12 may be installed such that the sleeve 12 protrudes beyond each one of opposing panel sides 102. However, it is contemplated that the sleeve 12 may be installed such that the sleeve 12 protrudes from one of the sides 102 of the panel 100.

Step 204 of the methodology 200 may further comprise installing penetration sealant 110 within an annular gap that may be formed between the outer sleeve surface 14 and the inner surface 108 of the penetration 106 as shown in FIG. 3. The diameter of the penetration 106 and sleeve 12 are preferably such that the size of the annular gap is minimized to minimize or eliminate the need for penetration sealant 110. If included, the penetration sealant 110 may be provided as water-proof based sealant such as room-temperature-curable (RTV) sealant including silicone-based sealant, rubber-based sealant or other sealant compositions.

Step 206 of the methodology 200 may include mounting one of the sleeve lock assemblies 10 to the sleeve 12 on one of the panel sides 102 by performing the following steps. The installation of one of the sleeve lock assembles 10 may be performed in Steps 208 to 222 described below.

Step 208 of the methodology 200 may include mounting a disc-shaped annular gasket 104 over the sleeve 12 and positioning the gasket 104 in substantially contacting relation with the panel side 102. The gasket 104 may preferably be formed of a resiliently elastic, water-resistant material such as rubber or other polymeric material that is resiliently deformable and may seal against a rough surface finish of an interior or exterior wall of a building or a floor or ceiling of a building.

Step 210 of the methodology 200 may comprise mounting a male ring member 40 on the sleeve 12. The male ring member 40 may be installed as shown in FIG. 3 wherein the radial flange may be placed in contacting relation to the panel side 102 or against the gasket 104, if included. The outer diameter of the radial flange 44 is preferably no larger than the outer diameter of the gasket 104 such that a substantial entirety of the surface area of the radial flange is in contact with the gasket 104.

Step 212 of the methodology 200 may include providing a female ring member 20 configured as described above. The female ring member 20 may include the cylindrical inner surface 30 and the annular ramp surface 32 for containing the locking member 60.

Step 214 of the methodology 200 may comprise installing the annular locking member 60 into the female ring member 20. The central band 66 of the locking member 60 may be retained against the inner surface 30 of the female ring member 20. In addition, the gripping flanges 68 may be formed at an angle that is complementary to the angle of the ramp surface 32 such that the gripping flange 68 may slide against the ramp surface 32.

Step 216 of the methodology 200 may include mounting the female ring member 20 over the sleeve 12. The threaded interior portion 24 of the female ring member 20 may be engaged with the threaded exterior portion 46 of the male ring member 40 as shown in FIG. 6 such that the locking member 60 is captured between the annular lip 28 and the end face 50.

Step 218 of the methodology 200 may comprise rotating the male and female ring members 40, 20 relative to one another to cause relative axial motion of the male and female ring members 40, 20. Referring to FIG. 7, relative rotation of the male and female ring members 40, 20 may cause the female ring member 20 to move toward the male ring member 40 along the direction shown 82.

Step 220 of the methodology 200 may include engaging the gripping flanges 68 to the outer sleeve surface 14 in response to rotation of the male and female ring members 40, 20 relative to one another. As shown in FIG. 7, the gripping flanges 68 may be oriented at a non-perpendicular angle relative to the axis 74 of the locking member 60 to facilitate engagement of the locking member with the outer sleeve surface 14 along the direction 80.

Step 222 of the methodology 200 may comprise preventing movement of the sleeve lock assembly 10 relative to the sleeve 12 as a result of the engagement of the gripping flanges 68 with the outer sleeve surface 14. In this manner, axial movement of the sleeve 12 relative to the panel 100 may be prevented.

Following the installation of a sleeve lock assembly 10 on one side of the panel 100, Steps 208 through 222 may be repeated to install a second sleeve lock assembly 10 on the opposite side 102 of the panel 100. During installation of the second sleeve lock assembly 10, the radial flanges 44 of the sleeve lock assemblies 10 on opposite sides 102 of the panel 100 may be compressed toward one another to remove axial play and to improve the sealing of the radial flanges 44 against the gaskets 104 on each side of the panel 100.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A sleeve lock assembly, comprising:
a male ring member slidably mountable on a sleeve having an outer sleeve surface, the male ring member having an axial flange and a radial flange, the axial flange having an annular end face and a threaded exterior portion, the male ring member being monolithic;
a female ring member including a collar having a threaded interior portion and an annular lip, the threaded interior portion configured to threadably engage the threaded exterior portion of the male ring member;
an annular locking member having opposing ends defining a gap therebetween, the locking member including at least one annular gripping flange for engaging the outer sleeve surface, the annular locking member being configured such that axial movement of the annular lip toward the annular end face during threadable engagement of the threaded interior portion onto the threaded exterior portion causes the annular gripping flange to be compressed radially inwardly and engage the outer sleeve surface; and
the annular locking member having one or more mechanical features including at least one of indentations, hashmarks, and protuberances formed in at least one gripping edge of the at least one gripping flange, the mechanical features configured to be driven at least partially into the outer sleeve surface when the locking member is compressed radially inwardly.

2. The sleeve lock assembly of claim 1, wherein: the at least one annular gripping flange comprises a pair of annular gripping flanges.

3. The sleeve lock assembly of claim 2, wherein:
the locking member further includes an intermediate flange located between a pair of annular gripping flanges.

4. The sleeve lock assembly of claim 2, wherein:
the locking member includes a central band;
the annular gripping flanges and the central band defining at least one concave region; and
a locking member sealant installed within the concave region in a manner such that the sealant seals the locking member to the outer sleeve surface.

5. The sleeve lock assembly of claim 1, wherein:
the radial flange of the male ring member includes an outer edge having surface features including at least one of the following: scallops, detents, flats, knurls.

6. The sleeve lock assembly of claim 1, wherein:
the collar of the female ring member has one or more external surfaces formed as a plurality of flats.

7. The sleeve lock assembly of claim 6, wherein:
the flats form a hex shape.

8. The sleeve lock assembly of claim 6, wherein:
the gap in the annular locking member has a serpentine shape preventing a line-of-sight path along an axial direction of the annular locking member.

\* \* \* \* \*